United States Patent [19]

Behrens et al.

[11] Patent Number: 4,532,527
[45] Date of Patent: Jul. 30, 1985

[54] OPTICAL PRINTING DEVICE

[75] Inventors: Herbert Behrens, Zetel; Rainer Marx, Wilhelmshaven; Jürgen Schmitt, Stadland, all of Fed. Rep. of Germany

[73] Assignee: Olympia Werke AG, Wilhelmshaven, Fed. Rep. of Germany

[21] Appl. No.: 521,939

[22] Filed: Aug. 10, 1983

[30] Foreign Application Priority Data

Aug. 13, 1982 [DE] Fed. Rep. of Germany ....... 3230110

[51] Int. Cl.³ .............................................. G01D 9/42
[52] U.S. Cl. ........................................ 346/108; 355/1; 350/96.15
[58] Field of Search ...................... 346/108, 107, 160; 350/96.15, 96.18, 96.24, 96.27; 358/901; 355/1

[56] References Cited

U.S. PATENT DOCUMENTS

| | | | |
|---|---|---|---|
| 4,364,064 | 12/1982 | Baues | 346/107 R |
| 4,405,207 | 9/1983 | Kay | 350/96.25 |
| 4,449,153 | 5/1984 | Tschang | 346/108 |
| 4,470,075 | 9/1984 | Yoshimoto | 346/108 |

Primary Examiner—E. A. Goldberg
Assistant Examiner—Mark Reinhart
Attorney, Agent, or Firm—Spencer & Frank

[57] ABSTRACT

An optical printing device for generating a linear light pattern which is applied to a moving photosensitive recording medium, which device is composed of a plurality of subassemblies each located for providing a respective segment of the linear light pattern, each subassembly including: a unit composed of a row of generally parallel optical fibers arranged to conduct light from a light source to their output ends, and a photocoupler composed of a thin transparent plate extending transversely of the direction of light propagation by the optical fibers and having a light entrance surface coupled to the output ends of the optical fibers to receive light therefrom, a light exit surface to which light is conducted from the light entrance surface, and lateral surfaces spaced apart in the direction of the linear pattern and extending between the light entrance and light exit surfaces. Each unit is constructed for causing substantially all of the light arriving at the light entrance surface from the optical fibers to be conducted to the light exit surface over a region thereof which, in the direction of the linear pattern, is shorter than the light entrance surface, with both ends of that region being spaced inwardly, in the direction of the linear pattern, from the corresponding ends of the light entrance surface, to enable the entire linear pattern on the recording medium to have an intensity which is uniform except for the variations resulting from modulation by the light switching cells.

8 Claims, 9 Drawing Figures

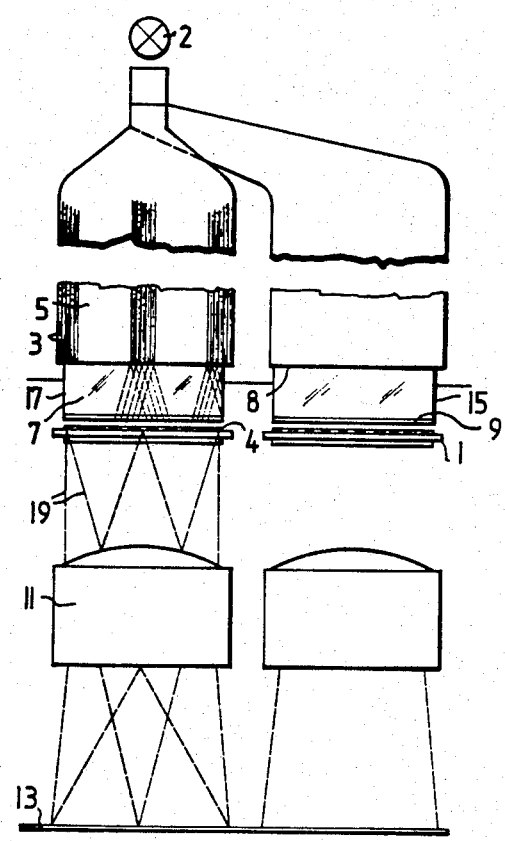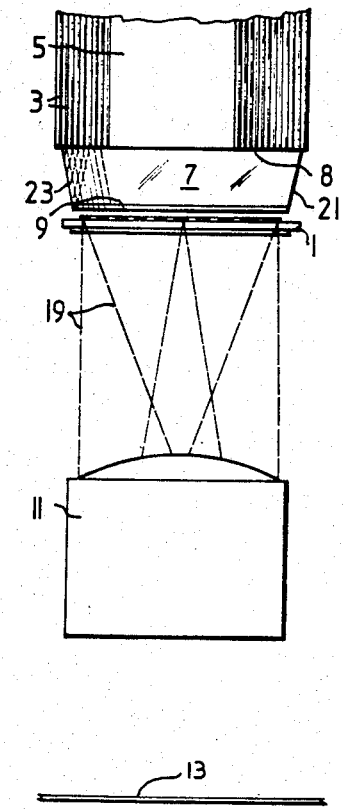

OPTICAL PRINTING DEVICE

BACKGROUND OF THE INVENTION

The present invention relates to devices for illuminating dot-shaped surface elements on a moving photosensitive record carrier.

It is already known to provide an optical printer with light switching elements each composed of a plurality of light switching cells. These light switching cells receive light from a light source via optical fibers.

The light switching cells can be selectively excited by control means including a character generator so that the light beams made available by the optical fibers are transferred by means of an imaging lens system to a movable photosensitive record carrier. e.g. an electrophotographic intermediate carrier.

In such printers, particularly at least if the light switching elements are arranged in a row, the imaging lens systems have an effective diameter which corresponds approximately to the length of the associated light switching cell. In order to overcome the thus occurring illuminating problems of the individual light switching arrays, it has already been proposed, as shown in FIG. 1, to provide photocouplers 7 between the light switching elements 1 and the photoconductor strips 5 which are comprised of a plurality of optical fibers 3 so as to better guide the light to the spatially very small light switching cells 4. The photocouplers 7 have a rectangular shape and project beyond the ends of the light switching cells so that the arrangement becomes less tolerance sensitive. The light switching cells 4 of the light switching elements 1 modulate the resulting light beams 19 which are transmitted, via an imaging lens system 11, to a photosensitive record carrier 13.

As shown in FIG. 1, each light switching cell 4 receives light from several light conductive fibers 3 since the latter emit light beams which propagate in the form of cones. The result is that the light switching cells 4 disposed in the edge regions of a light switching element 1 can be illuminated only from one side with half a light cone. Moreover, not all light beams impinging on the lateral surfaces 15 and 17 of the photocouplers 7 are totally reflected. Therefore the imaging lens system 11 also receives less light in the edge regions.

Then there are other problems that may result from light losses during reflection, from the spacing of the light exit surface 9 of a photocoupler 7 from the light switching cells 4 of a light switching element 1, and from the dissecting effect that may occur at the reflection surfaces 15 and 17.

Since the light switching cells 4 do not provide enough light for the imaging lens system in the edge regions, a charged photosensitive record carrier 13 is illuminated unevenly. The result is that because of the break in light intensity in the transition regions shown in FIG. 3, i.e. the regions between the lens systems 11 of FIG. 1, not enough discharges take place in the production of the charge image on the intermediate carrier 13 so that darker stripes may be produced on the record carrier during toner development, as shown in FIG. 2.

SUMMARY OF THE INVENTION

It is an object of the present invention to provide an illumination device which produces a stripe-shaped image of the light modulated by light switching cells, the image being of the same intensity over the entire width of the recording line on the photosensitive record carrier.

The above and other objects are achieved, according to the invention, in an optical printing device for generating a linear light pattern which is applied to a moving photosensitive recording medium, which device is composed of a plurality of subassemblies each located for providing a respective segment of the linear light pattern, each subassembly including: a unit composed of a row of generally parallel optical fibers having output ends and arranged to conduct light from a light source to their output ends, and a photocoupler composed of a thin transparent plate extending transversely of the direction of light propagation by the optical fibers and having a light entrance surface coupled to the output ends of the optical fibers to receive light therefrom, a light exit surface to which light is conducted from the light entrance surface, and lateral surfaces spaced apart in the direction of the linear pattern and extending between the light entrance and light exit surfaces, the light entrance surface being, in the direction of the linear pattern, shorter than the row of optical fibers at their output ends; a light switching element composed of a plurality of light switching cells disposed in a row in the direction of the linear pattern and positioned to receive the light emerging from the photocoupler light exit surface, the row of light switching cells being, in the direction of the linear pattern, shorter than the photocoupler light entrance surface, and the light switching cells being individually controllable for modulating the light received thereby in accordance with the respective segment of the linear pattern; and optical means disposed for imaging the light switching cells on the recording medium, in that each unit is constructed for causing substantially all of the light arriving at the light entrance surface of the photocoupler from the output ends of the optical fibers to be conducted to the light exit surface over a region thereof which, in the direction of the linear pattern, is shorter than the light entrance surface, with both ends of the region being spaced inwardly, in the direction of the linear pattern, from the corresponding ends of the light entrance surface, for causing the entire linear pattern on the recording medium to have an intensity which is uniform except for the variations resulting from modulation by the light switching cells.

The device according to the present invention permits stripe-shaped, or strip-shaped, imaging of the light source with the same light intensity over the entire recording line on a photosensitive record carrier in such a manner that the edge regions of the individual light switching elements and thus all of the transition regions on the developed record carrier can no longer be distinguished.

Advantageously, according to the invention, the lateral surfaces which extend between the light entrance and exit surfaces of each light coupler are formed as light deflection surfaces so that light impinging at the outer regions of the light entrance surface is reflected with low losses toward the light exit surface. This prevents in the simplest manner light intensity losses at the edge regions of the light switching elements.

Further advantageous features of the invention are described below.

The invention will now be described in greater detail with reference to the drawing figures.

BRIEF DESCRIPTION OF THE DRAWING

FIG. 1 is a simplified pictorial view of an optical printer according to the prior art.

FIG. 4 is a partial pictorial view of an optical printer provided with a first embodiment of a photocoupler according to the invention.

DESCRIPTION OF THE PREFERRED EMBODIMENTS

Figure 2:
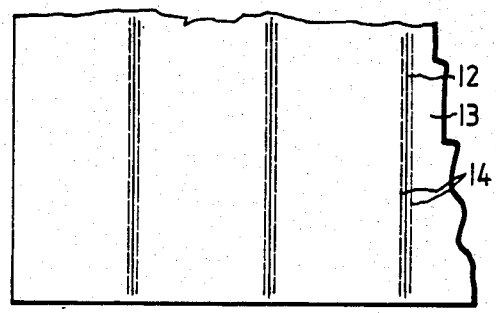
FIG. 2 is a top plan view of a record carrier according to the prior art showing poorly illuminated regions.

The optical printer according to the prior art shown in principle in FIG. 1 includes a light source 2 whose light is conducted, via optical fibers 3 combined into photoconductor strips 5, to photocouplers 7. Each strip 5 is thus constituted by a row of adjacent fibers 3. In order to assure good coupling in of the light beams from the optical fibers 3 into the light entrance surface 8 of each photocoupler 7, the free ends of the optical fibers 3 are placed as perpendicularly as possible to, and under tension on, the light entrance surface 8.

After leaving the light exit surface 9 of a photocoupler 7, the conically propagating light impinges on light switching cells 4 of light switching elements 1. These light switching elements 1 are comprised of a plurality of light switching cells 4 disposed side-by-side, e.g. 512 magneto-optic light switching cells 4 which can be individually selectively excited by a circuit arrangement (not shown) including, for example, a character generator so as to selectively modulate light beams. These controlled light beams are imaged via an imaging lens system 11 onto a photosensitive record carrier 13.

Figure 3:
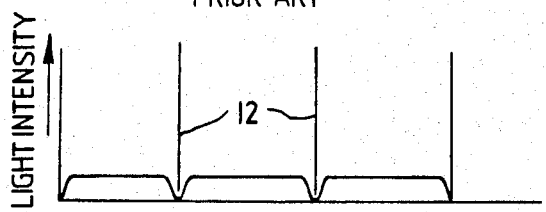
FIG. 3 shows a diagram corresponding to FIG. 2 of the light intensity losses in the transition regions.

Since fewer light beams impinge on the edge regions of the light exit surfaces 9 than in the center region, light intensity losses occur, as depicted in FIG. 3. in the transition regions 12 between individual light switching elements 1 and these light intensity losses produce dark stripes 14 (FIG. 2) on the developed record carrier 13. Due to the reduced light intensity in the transition regions 12, charges existing on the photosensitive record carrier 13 are not removed. The remaining residual charges gradually attract toner and produce the dark stripes 14 in the subsequent fixing step. The present invention now intends to avoid the above stated drawbacks.

A first embodiment is shown in FIG. 4. Here, the ends of the photoconductor strips 5 extend, in the direction of the recorded lines, somewhat beyond the light entrance surface 8 of the associated photocoupler 7. Moreover, each photocoupler 7 is composed of a thin glass plate which has a thickness of, for example, 0.3 mm perpendicular to the plane of the drawing. The side faces 21, 23 of each photocoupler 7 are sloped, or taper, from the light entrance surface 8 to the light exit surface 9 so that the light exit surface 9 is shorter than the light entrance surface 8 in the direction of the recorded line.

The sloped side faces 21, 23, which are designed as deflection surfaces, reflect the impinging light beams in such a manner that the light emanating from the light exit surface 9 and modulated by light switching cells 4 produces a uniform illumination on the record carrier 13. Due to the sloped side faces 21, 23, several light cones fall optimally through the critical edge regions. From the light exit surface 9, the light then travels to light switching cells 4 of light switching elements 1 from where light beams 19 are focussed on photosensitive record carrier 13 by lens systems 11. The lateral surfaces 21 and 23 have the inclinations of, for example, 0.5–3 grade to the direction of the optical fibers 3.

Figure 5:
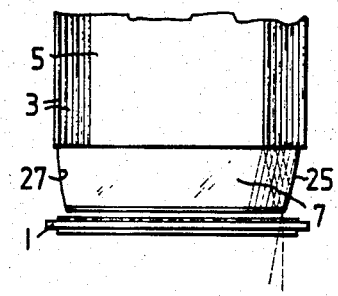
FIG. 5 is a detail view of a further embodiment of a photocoupler according to the invention.

Within the scope of the invention, the lateral deflection surfaces may also be designed, as shown in FIG. 5, as curved surfaces 25 and 27 which are concave with respect to the light beams in the glass plates. This also assures uniform light distribution over the entire recording line on the record carrier 13. The curved surfaces 25 and 27 have a curve radius of, for example, greater than 200 mm. Each photocoupler 7 has a length of about 33.5 mm.

Figure 6:
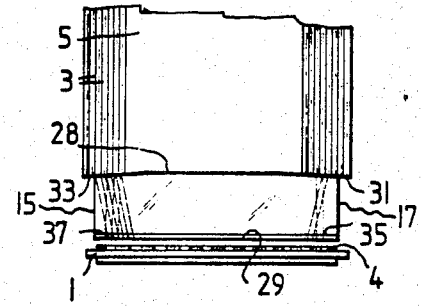
FIg. 6 is a view similar to that of FIG. 4 of another embodiment of the invention with modified light entrance surface.

Uniform light intensity can also be realized from effectively shorter light exit surfaces 29, as shown in FIG. 6, in that the narrow side faces 15 and 17 of each photocoupler 7 extend parallel to the major direction of the light and the light entrance surface 28 is oriented generally perpendicularly to the major direction of the light in the center region while being sloped in its edge regions 31 and 33 where the outer light beams are refracted toward fthe effectively shorter light exit surface 29. The edge regions 35 and 37 of the light exit surface 29 remain substantially free of light. Moreover, the length of the effective region of light switching element 1 is slightly less than the length of the effectively active light exit surface 29. The edge regions 31 and 33 are formed as sloped straight lines which have an inclination of 1°–3° grade to the straight line of the light entrance surface 28.

Figure 7:
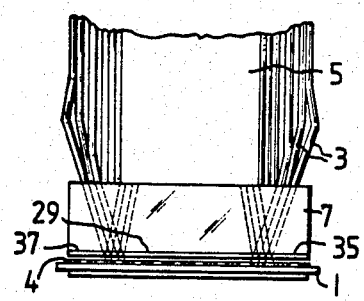
FIGS. 7 and 8 are views similar to that of FIG. 5 of further embodiments of the invention.

An effectively shorter light exit surface 29 as shown in FIG. 6 can also be realized, as shown in FIG. 7, by orienting the outer optical fibers 3 of the photoconductor strips 5 obliquely such that their light beams impinge on the edge region of the effectively shorter light exit surface 29. This likewise produces uniform intensity distribution on record carrier 13 of the light which exits from light exit surface 29, with the light entrance surface 28 as well as the light exit surface 29 forming planes perpendicular to the major direction of the light. The inclinations of only some outermost fibers 3 amount to 1°–3° grade. The middle fibers have no inclinations. The outside optical fibers 3 have such inclination that the light coming from the effectively shorter light exit surfaces reaches the record carrier with uniform intensity.

Figure 8:
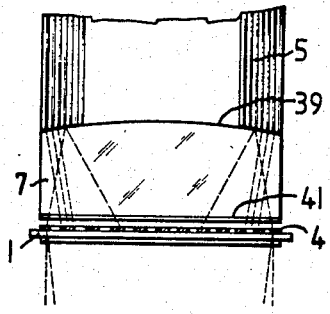
Figure 9:
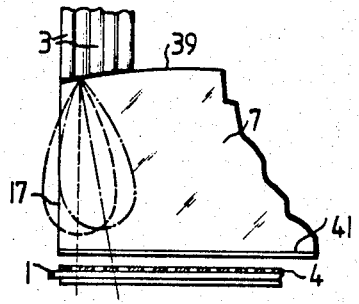
FIG. 9 is a detail view of a portion of the structure of FIG. 8.

FIG. 8 shows a further embodiment in which the light entrance surface 39 is curved with respect to the planar light exit surface 41 so that the light beams exiting from the flat ends of the optical fiber 3 are refracted toward a narrower effective light exit surface 41. FIG. 9 shows in broken lines a normal light cone associated with planar light entrance surface and in chain lines a light cone which has been deflected at the curved light entrance surface 39. The radius of curvature of light entrance surface 39 is greater than 300 mm.

Thus, arrangements according to the present invention guide the light cones emanating from the light entrance surfaces in such a manner that the light coming from the effectively shorter light exit surfaces and modulated by the light switching cells reaches the record carrier with unfirom intensity. In this way the printed images produced on the photosensitive record carriers are uniform and dark stripes resulting from intensity fluctuations on the record carriers of prior art arrangements are avoided in the simplest manner. The effective length of the light entrance surface 8 has a value of, for example 33.5 mm and the light exit surface 9 has a length of 32 mm. Moreover the length of each switching cell 4 is a little smaller than the length of the light exit surface 9. This is important because the switching cells 4 are connected with the photocouplers 7 by adhesive means and is part of a great building element. Therefore the light from the edges of the light exit surface does not reach the record carrier 13. The adhesive means have variable thicknesses. The light coming from the switching cells 4 will increase in the direction of the recorded line on the photosensitive record carrier 13 as described in the pending patent application Ser. No. 06/486,937, filed 04/20/83, entitled "Optical Printed Head For Line-By-Line Recording Of Picture And Text Formation" and having Herbert Behrens, Rainer Marx and Jürgen Schmitt as inventors.

It will be understood that the above description of the present invention is susceptible to various modifications, changes and adaptations, and the same are intended to be comprehended within the meaning and range of equivalents of the appended claims.

What is claimed is:

1. In an optical printing device for generating a linear light pattern which is applied to a moving photosensitive recording medium, which device is composed of a plurality of subassemblies each located for providing a respective segment of the linear light pattern, each subassembly including: a unit composed of a row of generally parallel optical fibers having output ends and arranged to conduct light from a light source to their output ends, and a photocoupler composed of a thin transparent plate extending transversely of the direction of light propagation by the optical fibers and having a light entrance surface coupled to the output ends of the optical fibers to receive light therefrom, a light exit surface to which light is conducted from the light entrance surface, and lateral surfaces spaced apart in the direction of the linear pattern and extending between the light entrance and light exit surfaces, the light entrance surface being, in the direction of the linear pattern, shorter than the row of optical fibers at their output ends; a light switching element composed of a plurality of light switching cells disposed in a row in the direction of the linear pattern and positioned to receive the light emerging from the photocoupler light exit surface, the row of light switching cells being, in the direction of the linear pattern, shorter than the photocoupler light entrance surface, and the light switching cells being individually controllable for modulating the light received thereby in accordance with the resepective segment of the linear pattern; and optical means disposed for imaging the light switching cells on the recording medium, the improvement wherein each said unit is constructed to present means for causing substantially all of the light arriving at said light entrance surface of said photocoupler from the output ends of said optical fibers to be conducted to said light exit surface over a region thereof which, in the direction of the linear pattern, is shorter than said light entrance surface, with both ends of said region being spaced inwardly, in the direction of the linear pattern, from the corresponding ends of said light entrance surface, for causing the entire linear pattern on the recording medium to have an intensity which is uniform except for the variations resulting from modulation by said light switching cells.

2. Device as defined in claim 1 wherein said lateral surface of each said photocoupler are constructed as light deflection surfaces which at least in part constitute said means for causing and which reflect light impinging near the ends of said light entrance surface, with low losses, toward said light exit surface region.

3. Device as defined in claim 2 wherein said lateral surfaces of each said photocoupler are sloping surfaces which converge from said light entrance surface to said light exit surface.

4. Device as defined in claim 2 wherein said lateral surfaces of each said photocoupler are curved surfaces which extend from said light entrance surface to said light exit surfaces, said curved surfaces being concave with respect to the light in said photocouplers.

5. Device as defined in claim 1 wherein said lateral surfaces of each said photocoupler extend parallel to the direction of light propagation by said optical fibers and said light entrance surface is perpendicular to the direction of light propagation in the center region of said light entrance surface and slopes in the edge regions of said light entrance surface to at least in part constitute said means for causing and to refract light from said edge regions of said light entrance surface toward said light exit surface region.

6. Device as defined in claim 1 wherein said light entrance surface of each said photocoupler lies in a plane perpendicular to the direction of light propagation by said optical fibers and the outer optical fibers of said row of optical fibers of each said unit are inclined, at least in the vicinity of their output ends to direct light from their output ends to said photocoupler light exit surface region, said outer optical fibers at least in part constituting said means for causing.

7. Device as defined in claim 1 wherein said light entrance surface of each said photocoupler is curved and at least in part constitutes said means for causing, and said light exit surface of each said photocoupler is planar.

8. Device as defined in claim 1 wherein said transparent plate of each said photocoupler is made of glass.

* * * * *